United States Patent
Wu et al.

(10) Patent No.: US 11,954,017 B2
(45) Date of Patent: Apr. 9, 2024

(54) DYNAMIC ANALYSIS OF REST API TESTING IN MICROSERVICE ARCHITECTURE

(71) Applicant: Dell Products L.P., Round Rock, TX (US)

(72) Inventors: Xiaojun Wu, Shanghai (CN); Jing J. Chen, Newton, MA (US); Muzhar S. Khokhar, Shrewsbury, MA (US); Haijun Zhong, Shanghai (CN)

(73) Assignee: Dell Products L.P., Round Rock, TX (US)

( * ) Notice: Subject to any disclaimer, the term of this patent is extended or adjusted under 35 U.S.C. 154(b) by 43 days.

(21) Appl. No.: 17/586,827

(22) Filed: Jan. 28, 2022

(65) Prior Publication Data
US 2023/0244593 A1    Aug. 3, 2023

(51) Int. Cl.
*G06F 21/57*        (2013.01)
*G06F 9/54*         (2006.01)
(Continued)

(52) U.S. Cl.
CPC ...... *G06F 11/3676* (2013.01); *G06F 11/3688* (2013.01); *G06F 9/547* (2013.01);
(Continued)

(58) Field of Classification Search
CPC ............. G06F 11/3676; G06F 11/3688; G06F 11/3664; G06F 11/0766; G06F 11/3636;
(Continued)

(56) References Cited

U.S. PATENT DOCUMENTS

2014/0075242 A1* 3/2014 Dolinina ............. G06F 11/3672
                                                      714/E11.178
2018/0039565 A1* 2/2018 Rajagopalan ....... G06F 11/3476
(Continued)

FOREIGN PATENT DOCUMENTS

CN        116155771 A    *   5/2023

OTHER PUBLICATIONS

Andrea Arcuri, RESTful API Automated Test Case Generation with EvoMaster, Jan. 2019, [Retrieved on Nov. 8, 2023]. Retrieved from the internet: <URL: https://dl.acm.org/doi/pdf/10.1145/3293455> 37 Pages (1-37) (Year: 2019).*
(Continued)

*Primary Examiner* — Anibal Rivera
(74) *Attorney, Agent, or Firm* — Jackson Walker L.L.P.

(57) ABSTRACT

A testing method accesses tracing data comprising a plurality of tracing records corresponding to a plurality of test cases executed on a target system. The target system includes a plurality of microservices configured in accordance with a REST API. A dynamic test analyzer accesses the tracing data and imports a definition of the REST API. The analyzer checks each tracing record for consistency with the API definition. Based on this checking of the tracing records, one or more coverage metrics may be calculated. If any one or more of the one or more coverage metrics fails to exceed a threshold coverage, a testing action may be required. In some cases, the testing action may be selected from either seeking additional coverage of the APIs included in the target system or seeking additional test result coverage.

15 Claims, 2 Drawing Sheets

(51) Int. Cl.
*G06F 11/36* (2006.01)
*G06F 11/07* (2006.01)
*G06F 11/30* (2006.01)
*G06F 11/34* (2006.01)
*G06F 21/62* (2013.01)

(52) U.S. Cl.
CPC ...... *G06F 11/0766* (2013.01); *G06F 11/3034* (2013.01); *G06F 11/3428* (2013.01); *G06F 11/3636* (2013.01); *G06F 11/3664* (2013.01); *G06F 11/3684* (2013.01); *G06F 11/3692* (2013.01); *G06F 21/577* (2013.01); *G06F 21/6227* (2013.01)

(58) Field of Classification Search
CPC ............. G06F 11/3692; G06F 11/3684; G06F 11/3428; G06F 11/3034; G06F 21/577; G06F 21/6227; G06F 9/547
See application file for complete search history.

(56) References Cited

U.S. PATENT DOCUMENTS

| | | | | |
|---|---|---|---|---|
| 2018/0254996 | A1* | 9/2018 | Kairali | H04L 67/1036 |
| 2019/0312800 | A1* | 10/2019 | Schibler | H04L 41/0869 |
| 2020/0012591 | A1* | 1/2020 | Shuster | G06F 11/3688 |
| 2020/0250074 | A1* | 8/2020 | Zhang | G06F 11/3664 |
| 2021/0124576 | A1* | 4/2021 | Gungabeesoon | G06F 8/38 |
| 2021/0334384 | A1* | 10/2021 | Ranjan | G06F 11/3636 |

OTHER PUBLICATIONS

Andre Pascoal Bento, Observing and Controlling Performance in Microservices, Jul. 2019, [Retrieved on Nov. 8, 2023]. Retrieved from the internet: <URL: https://jorge-cardoso.github.io/projects/pdf_img/MSc_thesis_Andre_Bento.pdf> 89 Pages (1-89) (Year: 2019).*

* cited by examiner

301 → $CR_{exp} = \{ f_{pc}(a) \mid a \in PR \}$

302 → $PR_{exp} = \{ f_{tp}(t) \mid t \in T \}$

303 → $API\_coverage = |PR_{act} \cap PR_{exp}| / |PR_{exp}|$

304 → $Result\_coverage = |CR_{act} \cap CR_{exp}| / |CR_{exp}|$

305 → $API\_leak = |CR_{exp} - CR_{act}|$

306 → $Result\_leak = |PR_{exp} - PR_{act}|$

FIG. 3

DYNAMIC ANALYSIS OF REST API TESTING IN MICROSERVICE ARCHITECTURE

TECHNICAL FIELD

The present disclosure relates to testing and test coverage with respect to information handling system software.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Applications executed by information handling systems are increasingly developed from a microservice framework. Representational state transfer (REST) application programming interface (API) or REST API, is a popular API for building microservices. REST API provides a standard communication interface among microservices. OpenAPI is a format for describing and documenting REST APIs. Many REST APIs are designed with an OpenAPI document that may be published to other microservices as interface documentation. It is important to verify that the microservice functionality is consistent with the OpenAPI definition and check the API consistency in microservice releases. But it is difficult to achieve this today because a lot of test effort needed to call these large amount of REST APIs and check the request and response following the OpenAPI document. In this invention, a system is introduced to analyze REST API calls dynamically during the microservice functional verification test and system verification test, which reduce a lot of manual effort.

SUMMARY

In accordance with subject matter disclosed in the following description, a testing method accesses tracing data, comprising a plurality of tracing records corresponding to a plurality of test cases executed on a target system. The target system includes a plurality of microservices configured in accordance with a REST API. A dynamic test analyzer accesses the tracing data and imports a definition of the REST API. The analyzer checks each tracing record for consistency with the API definition. Based on this checking of the tracing records, one or more coverage metrics may be calculated. If any one or more of the coverage metrics fails to exceed a threshold coverage, a testing action may be required. In some cases, the testing action may be selected from either seeking additional coverage of the APIs included in the target system or seeking additional test result coverage.

The coverage metrics may include an API coverage metric, indicative of a percentage of APIs exercised by the test cases. The API coverage metric may be determined based on actual return values and expected return values. The API coverage metric may be calculated as a ratio of the intersection between actual results and expected results and the expected results (see FIG. 3 equation 303)

The coverage metrics may further include a result coverage metric determined based on a set of actual APIs encountered and a set of expected APIs. Specifically, the result coverage metric may be based on the intersection of the actual APIs and the expected APIs over the expected APIs. (see FIG. 3 equation 304).

If the coverage is less than a threshold value which may be 100% or some lower value, leakage parameters may be determined and used to identify subsequent testing action. An API leakage metric may indicate a discrepancy between the set of expected results and the set of actual results (see FIG. 3 equation 305) while a result leakage metric indicates the discrepancy between the set of expected APIs and the set of actual APIs. (See FIG. 3 equation 306)

In at least some embodiments, the API coverage metric is determined based upon the set of expected results. The set of expected results is determined based upon a functional predicate of the APIs. (see FIG. 3 equation 301).

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein:

FIG. 3 illustrates various equations for calculating metrics and other parameters disclosed herein.

DETAILED DESCRIPTION

Figure 1:
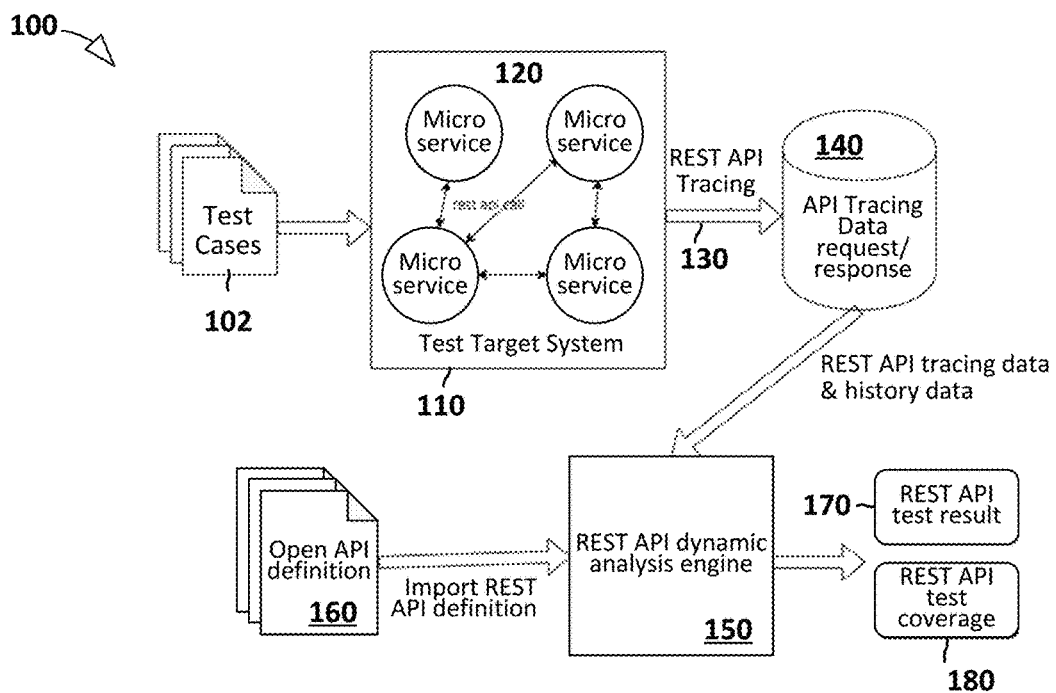
FIG. 1 illustrates an exemplary testing platform in accordance with disclosed teachings.
Figure 2:
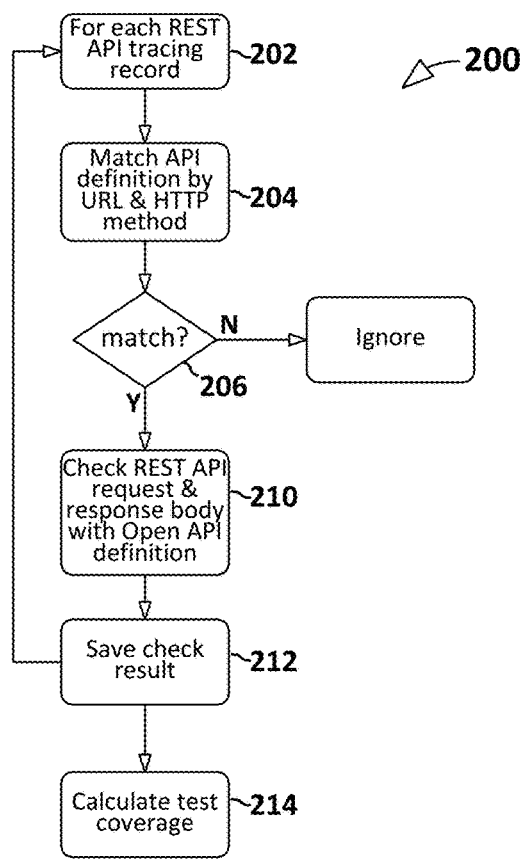
FIG. 2 illustrates an flow diagram of a method of processing REST API tracing records in accordance with disclosed teachings.

Exemplary embodiments and their advantages are best understood by reference to FIGS. 1-3, wherein like numbers are used to indicate like and corresponding parts unless expressly indicated otherwise.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU"), microcontroller, or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

Additionally, an information handling system may include firmware for controlling and/or communicating with, for example, hard drives, network circuitry, memory devices, I/O devices, and other peripheral devices. For example, the hypervisor and/or other components may comprise firmware. As used in this disclosure, firmware includes software embedded in an information handling system component used to perform predefined tasks. Firmware is commonly stored in non-volatile memory, or memory that does not lose stored data upon the loss of power. In certain embodiments, firmware associated with an information handling system component is stored in non-volatile memory that is accessible to one or more information handling system components. In the same or alternative embodiments, firmware associated with an information handling system component is stored in non-volatile memory that is dedicated to and comprises part of that component.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, service processors, basic input/output systems (BIOSs), buses, memories, I/O devices and/or interfaces, storage resources, network interfaces, motherboards, and/or any other components and/or elements of an information handling system.

In the following description, details are set forth by way of example to facilitate discussion of the disclosed subject matter. It should be apparent to a person of ordinary skill in the field, however, that the disclosed embodiments are exemplary and not exhaustive of all possible embodiments.

Throughout this disclosure, a hyphenated form of a reference numeral refers to a specific instance of an element and the un-hyphenated form of the reference numeral refers to the element generically. Thus, for example, "device 12-1" refers to an instance of a device class, which may be referred to collectively as "devices 12" and any one of which may be referred to generically as "a device 12".

As used herein, when two or more elements are referred to as "coupled" to one another, such term indicates that such two or more elements are in electronic communication, mechanical communication, including thermal and fluidic communication, thermal, communication or mechanical communication, as applicable, whether connected indirectly or directly, with or without intervening elements.

FIG. 1 illustrates a testing platform 100 in accordance with disclosed teachings for dynamically evaluating various coverage metrics within a REST API environment. The testing platform 100 illustrated in FIG. 1 includes a set of test cases 100 to being executed on a target test system 110. The target test system includes a plurality of microservices 120, of which for microservices are explicitly depicted in FIG. 1 although those of ordinary skill will recognize that more or fewer microservices may be included in other implementations. The microservices 120 illustrated in FIG. 1 are represented as nodes and those nodes are illustrated connected by edges that correspond to API calls in accordance with the REST API.

Executing the test cases on the target system produces REST API tracing data 130 that is stored in an API tracing data storage resource 140. A dynamic analysis engine 150 accesses the tracing data 140 and imports a REST API definition 160. Dynamic analysis engine 150 compares the tracing data and history data against the REST API definition, determines one or more coverage statistics, and generates REST API test result 170 and a REST API test coverage 180.

Referring now to FIG. 2, a flow diagram illustrates a method 200 performed by the REST API dynamic analysis engine 150 of FIG. 1 as the engine processes each REST API tracing record created by the test cases discussed in the description of FIG. 1. The illustrated method 200 begins in block 202, where the dynamic analysis engine obtains the next REST API tracing record and then tries to match (block 204) the API definition against the tracing record by the indicated URL and it HTTP method. If (block 206) a match is detected, program flow branches to block 210 where the analysis engine checks the REST API request and response body against the open API definition and then saves (block 212) the check result before branching back to process the next REST API tracing record at block 202. When all tracing records have been processed, program flows out of block 212 to the end block 214 where a test coverage metric is calculated.

FIG. 3 illustrates a set of equations in which the variable PR indicates the set of APIs such that PR equals (A1, A2, ... AN), in which A1 ... AN represents all APIs. CR is defined as the set of return values such that CR equals (R1, R2 ... RN) wherein R1 ... RN represents all API return values. The quantity T represents the set of test cases where T equals (T1, T2, ... TN), in which T1 ... TN represents all test cases.

Disclosed subject matter defines a functional predicate of mappings between sets PR, CR, and T these functional predicates are indicated as FPC & FTP.

FIG. 3 illustrates, in equation 301, the relationship between the set of expected return values CREXP and the functional predicate FPC(a) where a is an element of the API set PR.

Equation 302 indicates the expected set of APIs, PREXP equals FTP(t) where t is an element of T.

Equations 301 and 302 define mapping between test cases in APIs and mapping between APIs and results, which adds flexibility in defining test suite sets for different purposes.

If actual results are denoted by the subscript ACT then testing execution coverage can be calculated as shown in equation 303 for API coverage and 304 for test result coverage.

If coverage is not 100%, then leakage parameters may be calculated according to equations 305 for API leakage and 306 for result leakage.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

What is claimed is:

1. A testing method for use in a microservice environment, wherein the testing method comprises:
    executing a plurality of test cases on a target system comprising a plurality of microservices to produce representational state transfer application programming interface (REST API) tracing data comprising a plurality of tracing records corresponding to the plurality of test cases;
    accessing the tracing data, wherein the target system includes a plurality of microservices configured in accordance with a representational state transfer application programming interface (REST API);
    importing a definition of the REST API;
    checking each of the tracing records for consistency with the REST API definition wherein said checking includes attempting to match the REST API definition with each tracing record via universal resource locator (URL) and hypertext transport protocol (HTTP) trace methods;
    based on said checking of the tracing records, calculating one or more coverage metrics; and
    responsive to any one or more of the one or more coverage metrics not exceeding a threshold coverage, selecting a testing action in accordance with the one or more coverage metrics, wherein the testing action is selected from a group comprising:
    seeking additional API coverage; and
    seeking additional test result coverage.

2. The testing method of claim 1, wherein the one or more coverage metrics include an API coverage metric indicative of a percentage of API's exercised by the test cases.

3. The testing method of claim 2, wherein the API coverage metric is determined based on actual return values and expected return values.

4. The testing method of claim 1, wherein the one or more coverage metrics include a result coverage metric indicative of a percentage of possible test results covered by the test cases.

5. The testing method of claim 4, wherein the result coverage metric is determined based on actual APIs exercised and expected APIs executed.

6. An information handling system, comprising:
    a central processing unit (CPU); and
    a computer readable memory, accessible to the processor, including processor executable instructions that, when executed by the processor, cause the processor to perform operations comprising:
        executing a plurality of test cases on a target system comprising a plurality of microservices to produce representational state transfer application programming interface (REST API) tracing data comprising a plurality of tracing records corresponding to the plurality of test cases;
        accessing the tracing data, wherein the target system includes a plurality of microservices configured in accordance with a representational state transfer application programming interface (REST API);
        importing a definition of the REST API;
        checking each of the tracing records for consistency with the REST API definition wherein said checking includes attempting to match the REST API definition with each tracing record via universal resource locator (URL) and hypertext transport protocol (HTTP) trace methods;
        based on said checking of the tracing records, calculating one or more coverage metrics; and
        responsive to any one or more of the one or more coverage metrics not exceeding a threshold coverage, selecting a testing action in accordance with the one or more coverage metrics, wherein the testing action is selected from a group comprising:
    seeking additional API coverage; and
    seeking additional test result coverage.

7. The information handling system of claim 6, wherein the one or more coverage metrics include an API coverage metric indicative of a percentage of API's exercised by the test cases.

8. The information handling system of claim 7, wherein the API coverage metric is determined based on actual return values and expected return values.

9. The information handling system of claim 6, wherein the one or more coverage metrics include a result coverage metric indicative of a percentage of possible test results covered by the test cases.

10. The information handling system of claim 9, wherein the result coverage metric is determined based on actual APIs exercised and expected APIs executed.

11. A non-transitory computer readable medium including processor executable instructions that, when executed by the processor, cause the processor to perform operations comprising:
    executing a plurality of test cases on a target system comprising a plurality of microservices to produce representational state transfer application programming interface (REST API) tracing data comprising a plurality of tracing records corresponding to the plurality of test cases;

accessing tracing data comprising a plurality of tracing records corresponding to test cases executed on a target system, wherein the target system includes a plurality of microservices configured in accordance with a representational state transfer application programming interface (REST API);

importing a definition of the REST API;

checking each of the tracing records for consistency with the REST API definition wherein said checking includes attempting to match the REST API definition with each tracing record via universal resource locator (URL) and hypertext transport protocol (HTTP) trace methods;

based on said checking of the tracing records, calculating one or more coverage metrics; and responsive to any one or more of the one or more coverage metrics not exceeding a threshold coverage, selecting a testing action in accordance with the one or more coverage metrics, wherein the testing action is selected from a group comprising:

seeking additional API coverage; and seeking additional test result coverage.

12. The non-transitory computer readable medium of claim 11, wherein the one or more coverage metrics include an API coverage metric indicative of a percentage of API's exercised by the test cases.

13. The non-transitory computer readable medium of claim 12, wherein the API coverage metric is determined based on actual return values and expected return values.

14. The non-transitory computer readable medium of claim 11, wherein the one or more coverage metrics include a result coverage metric indicative of a percentage of possible test results covered by the test cases.

15. The non-transitory computer readable medium of claim 14, wherein the result coverage metric is determined based on actual APIs exercised and expected APIs executed.

* * * * *